(12) United States Patent
Miller et al.

(10) Patent No.: US 7,697,716 B2
(45) Date of Patent: Apr. 13, 2010

(54) WATERMARKING DIFFERENT AREAS OF DIGITAL IMAGES WITH DIFFERENT INTENSITIES

(75) Inventors: Marc D. Miller, Portland, OR (US); Donald Haaga, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 563 days.

(21) Appl. No.: 11/295,345

(22) Filed: Dec. 5, 2005

(65) Prior Publication Data

US 2006/0140441 A1 Jun. 29, 2006

Related U.S. Application Data

(63) Continuation of application No. 09/649,260, filed on Aug. 28, 2000, now abandoned.

(60) Provisional application No. 60/152,520, filed on Sep. 1, 1999.

(51) Int. Cl.
*G06K 9/00* (2006.01)
*B42D 15/00* (2006.01)
*H04L 9/32* (2006.01)
*H04N 1/40* (2006.01)

(52) U.S. Cl. .................. 382/100; 283/113; 713/176; 358/3.28

(58) Field of Classification Search .............. None
See application file for complete search history.

(56) References Cited

U.S. PATENT DOCUMENTS

| | | | |
|---|---|---|---|
| 4,231,656 A | 11/1980 | Dickey et al. | |
| 5,315,098 A * | 5/1994 | Tow .................... | 235/494 |
| 5,530,759 A | 6/1996 | Braudaway et al. | |
| 5,537,223 A | 7/1996 | Curry | |
| 5,613,004 A | 3/1997 | Cooperman | |
| 5,617,119 A | 4/1997 | Briggs et al. | |
| 5,734,752 A | 3/1998 | Knox | |
| 5,790,703 A | 8/1998 | Wang | |
| 5,822,436 A | 10/1998 | Rhoads | |
| 5,862,260 A | 1/1999 | Rhoads | |
| 5,893,101 A | 4/1999 | Balogh et al. | |

(Continued)

FOREIGN PATENT DOCUMENTS

EP 0961239 A2 * 12/1999

(Continued)

OTHER PUBLICATIONS

Huang, et al., "Adaptive image watermarking scheme based on visual masking," IEEE Electronic Letters, Apr. 1998, vol. 34, Issue 8, pp. 748-750.*

(Continued)

*Primary Examiner*—Charles Kim

(57) ABSTRACT

An image is processed to encode a digital watermark, with different regions thereof processed using different levels of watermark intensity. In an image comprised of elements of differing sizes (e.g., halftone shapes of different sizes, or lines of different width), the different regions can be defined by reference to the sizes of elements contained therein. Regions characterized by relatively small elements can be watermarked at a relatively low intensity. Regions characterized by relatively large elements can be watermarked at a relatively high intensity. A variety of other features are also discussed.

17 Claims, 7 Drawing Sheets

U.S. PATENT DOCUMENTS

| | | | |
|---|---|---|---|
| 5,901,178 A | 5/1999 | Lee et al. | |
| 5,905,800 A | 5/1999 | Moskowitz | |
| 5,930,369 A | 7/1999 | Cox | |
| 5,946,414 A | 8/1999 | Cass et al. | |
| 5,951,055 A | 9/1999 | Mowry, Jr. | |
| 6,031,914 A | 2/2000 | Tewfik et al. | |
| 6,122,403 A | 9/2000 | Rhoads | |
| 6,128,411 A | 10/2000 | Knox | |
| 6,141,441 A | 10/2000 | Cass et al. | |
| 6,181,802 B1 | 1/2001 | Todd | |
| 6,205,249 B1 | 3/2001 | Moskowitz | |
| 6,208,735 B1 | 3/2001 | Cox et al. | |
| 6,208,746 B1 | 3/2001 | Musgrave | |
| 6,222,932 B1 | 4/2001 | Rao | |
| 6,252,971 B1 * | 6/2001 | Wang | 382/100 |
| 6,272,176 B1 | 8/2001 | Srinivasan | |
| 6,272,260 B1 * | 8/2001 | Furukawa et al. | 382/261 |
| 6,281,903 B1 | 8/2001 | Martin | |
| 6,334,187 B1 | 12/2001 | Kadono | |
| 6,370,272 B1 | 4/2002 | Shimizu | |
| 6,384,935 B1 | 5/2002 | Yamazaki | |
| 6,404,908 B1 | 6/2002 | Schneider | |
| 6,449,377 B1 | 9/2002 | Rhoads | |
| 6,556,688 B1 | 4/2003 | Ratnakar | |
| 6,603,576 B1 | 8/2003 | Nakamura | |
| 6,631,198 B1 | 10/2003 | Hannigan et al. | |
| 6,633,654 B2 | 10/2003 | Hannigan et al. | |
| 6,778,678 B1 | 8/2004 | Podilchuk | |
| 6,856,429 B1 | 2/2005 | Noguchi | |
| 2001/0030769 A1 | 10/2001 | Jacobs | |
| 2001/0052076 A1 * | 12/2001 | Kadono | 713/176 |
| 2002/0054356 A1 | 5/2002 | Kurita et al. | |

FOREIGN PATENT DOCUMENTS

| | | |
|---|---|---|
| GB | 2346110 | 1/2000 |

OTHER PUBLICATIONS

Bender, "Applications for Data Hiding", IBM Systems Journal, vol. 39, No. 3-4, 2000, pp. 547-568.

IBM DataHiding Proposal, Version 1.0, Sep. 1997.

Kankanhalli, Content Based Watermarking of Images, Proceedings of the sixth ACM international conference on Multimedia, 1998.

Kutter, "Watermarking resisting to translation, rotation, and scaling," Proc. SPIE vol. 3528: Multimedia Systems and Applications, pp. 423-431, Nov. 1998.

Meng, Embedding Visible Video Watermarks in the Compressed Domain, Proc. IEEE Int. Conference in Image Processing, 1998.

Podilchuk et al, "Image Adaptive *Watermarking* Using Visual Models," IEEE Journal on Selected Areas in Communications, 16(4), May 1998.

* cited by examiner

WATERMARKING DIFFERENT AREAS OF DIGITAL IMAGES WITH DIFFERENT INTENSITIES

RELATED APPLICATION DATA

This application is a continuation of application Ser. No. 09/649,260, filed Aug. 28, 2000, which is a non-provisional of application 60/152,520, filed Sep. 1, 1999.

FIELD OF THE INVENTION

The present invention relates to steganography, and more particularly to techniques for watermarking digital images.

BACKGROUND AND SUMMARY

The technology for watermarking digital images is well developed. The intensity of the watermark determines both if the watermark will create visual artifacts and how easily the watermark will be to detect after an image has been printed, copied or otherwise transformed. When inserting a digital watermark into an image, it is desirable to utilize a high intensity watermark signal, that is, to change the intensity of the pixels in the image as much as possible so that it will be easy to detect and read the watermark. However, if the intensity of the watermark signal is too high, the watermark may create visual artifacts in the image, that is, the watermark signal may be visually evident.

Many watermarking technique are "perceptually adaptive". Perceptually adaptive watermarking techniques take into account the characteristics of an image in an effort to make a watermark relatively easy to detect and to avoid causing visually apparent artifacts in the watermarked image.

A perceptually adaptive watermarking technique is for example shown in U.S. Pat. No. 5,748,763 entitled "Image Steganography System Featuring Perceptually Adaptive and Globally Scalable Signal Embedding" by Geoffrey B. Rhoads. Certain commercially available image editing programs (such as the image edition program marketed by Adobe Corporation under the trademark "Adobe Photoshop") can watermark digital images using perceptually adaptive techniques.

The technology detailed herein concerns watermarking an image using the highest practical watermark intensity that can be used without creating visual artifacts. An image is divided into areas. Each area only contains portions of the image where it is appropriate to use a watermark signal having the same energy level.

Some images consist of a series of lines. Such images are often used as the background image on security documents or currency. If an image consists of a series of lines, the technology described herein can be applied by dividing the image into areas where the lines that form the image are within a certain range of widths. An appropriate watermark intensity is then determined for each such area and a watermark of this intensity is applied to the image. Watermarks can be applied to such images using the line width modulation techniques shown in co-pending U.S. applications Ser. No. 09/074,034, filed May 6, 1998 which corresponds PCT/US99/08252, and Ser. No. 09/127,503, filed Jul. 31, 1998 which corresponds to PCT/US99/14532.

If an image is a grayscale image, areas having the same tonal value or tonal density are determined directly, or the image is transformed into a line art image and areas with the same size binary valued areas (lines, dots, squares, etc.) are selected by filtering the image.

After the image has been divided areas which have a line width or tonal density value that is within a certain range of values, an appropriate watermark energy level is assigned to each area. The image is watermarked by changing the value of each bit or pixel in the image by an amount determined by both the value in a payload tile and the intensity value associated with the area in which the bit or pixel lies.

The described technology is applicable to watermarking techniques which change the value of a binary parameter in areas of an image (for example, by modulating the width of lines in a line image) or to watermarking techniques which change the value of a multi-valued parameter in areas of the image (for example, by changing the luminance value of the pixels in an image).

DETAILED DESCRIPTION OF A PREFERRED EMBODIMENT

In a first preferred embodiment, the technology is applied to an image which consists of a series of lines. Images which consist of a series of lines are, for example, often found as background imagery on security documents and on currency. A digital watermark can be inserted into such an image using line width modulation techniques such as those shown in co-pending U.S. patent applications Ser. No. 09/074,034, filed May 6, 1998 which corresponds PCT/US99/08252 (and which has now issued as U.S. Pat. No. 6,449,377), and Ser. No. 09/127,503, filed Jul. 31, 1998 which corresponds to PCT/US99/14532 (now published as WO0007356). The disclosures of the above referenced documents are incorporated herein in their entireties A typical image which consists of a series of lines will have a relatively complex set of lines; however for ease of explanation the technology will herein be described as applied to a very simple image. This technology can be applied to complex images in exactly the same was as described herein as applied to a simple image.

Figure 1:
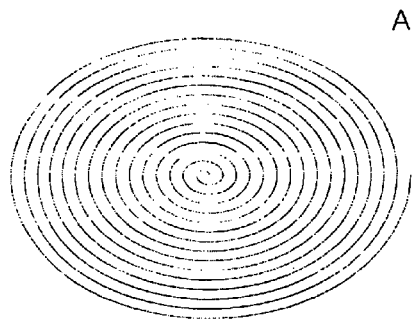
FIG. 1 shows three areas each of which have lines of different width.
Figure 1:
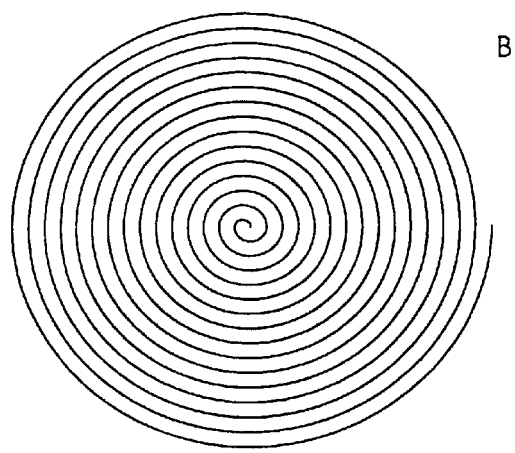
Figure 1:
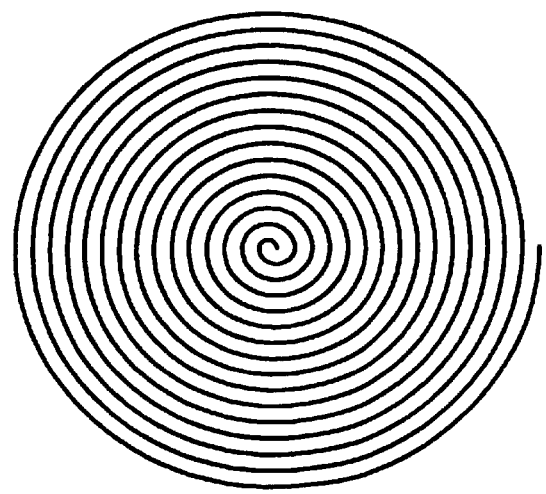

FIG. 1 shows three areas designated A, B, and C. Each of the areas. A, B, and C has lines with a width that differs from the width of the lines in the other areas. The lines in area A are relatively narrow, the lines in area C are relatively wide, and the lines in area B have an intermediate width. Area C can absorb much more watermarking energy than can area A without creating any visual artifacts.

For ease of reference the line width in the three areas (in terms of pixels and resolution) will hereinafter be referred to by line width index numbers as follows:

Area A—0.5
Area B—1.0
Area C—2.0

The actual width of the lines in terms of pitch or pixel width will depend upon the specific application. For example, an index number of 1.0 could for example correlate to a pitch of 2. The relative width of the lines and this relative width can be most easily represented in a general manner by using index numbers.

Figure 2:
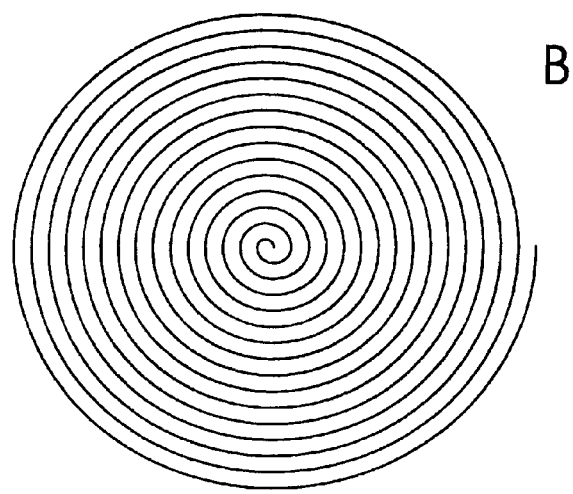
FIG. 2 shows an image after a mask has been applied.
Figure 2:
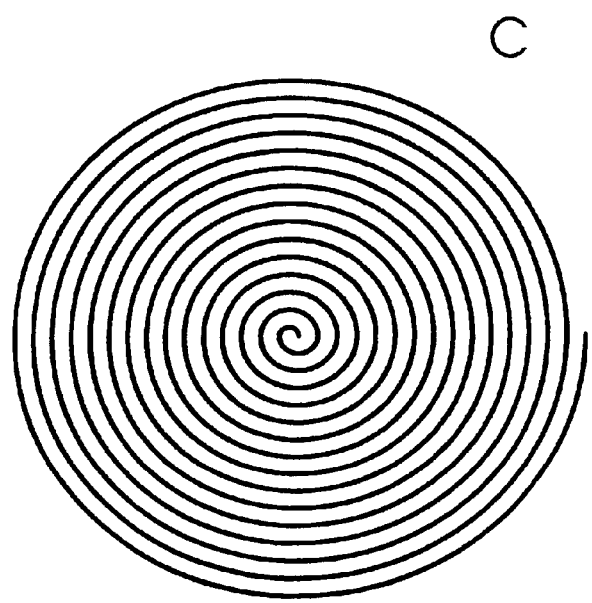

Many commercially available image editing programs (such as, for example, Adobe Photoshop) include the ability to make image filters, and masks. For example, using such programs an image can be filtered to eliminate all lines that have (in terms of the above line width index values) a width of less than 1.0. If such a filter is applied to the image shown in FIG. 1, area A would be eliminated, resulting in an image such as that shown in FIG. 2 which only has areas B and C. The image in FIG. 2 could then be subtracted from the image shown in FIG. 1 to produce an image (or mask) that only includes the image in area A. Next the image could be filtered to remove all lines with a line width index of less than 2.0. The result would be an image with only area C. The image with area C could be subtracted from the image with areas B and C to produce an image with only area B. One would thus have three images (or masks) each of which include lines with a particular line width index, that is, each of which specify an area which should be watermarked at a particular intensity.

It is desirable to watermark the three areas in the original image (each of which is defined by a different mask) with the maximum watermark energy without creating visual artifacts. The three masks described above can be used to control the watermarking operation as described below.

Figure 3:
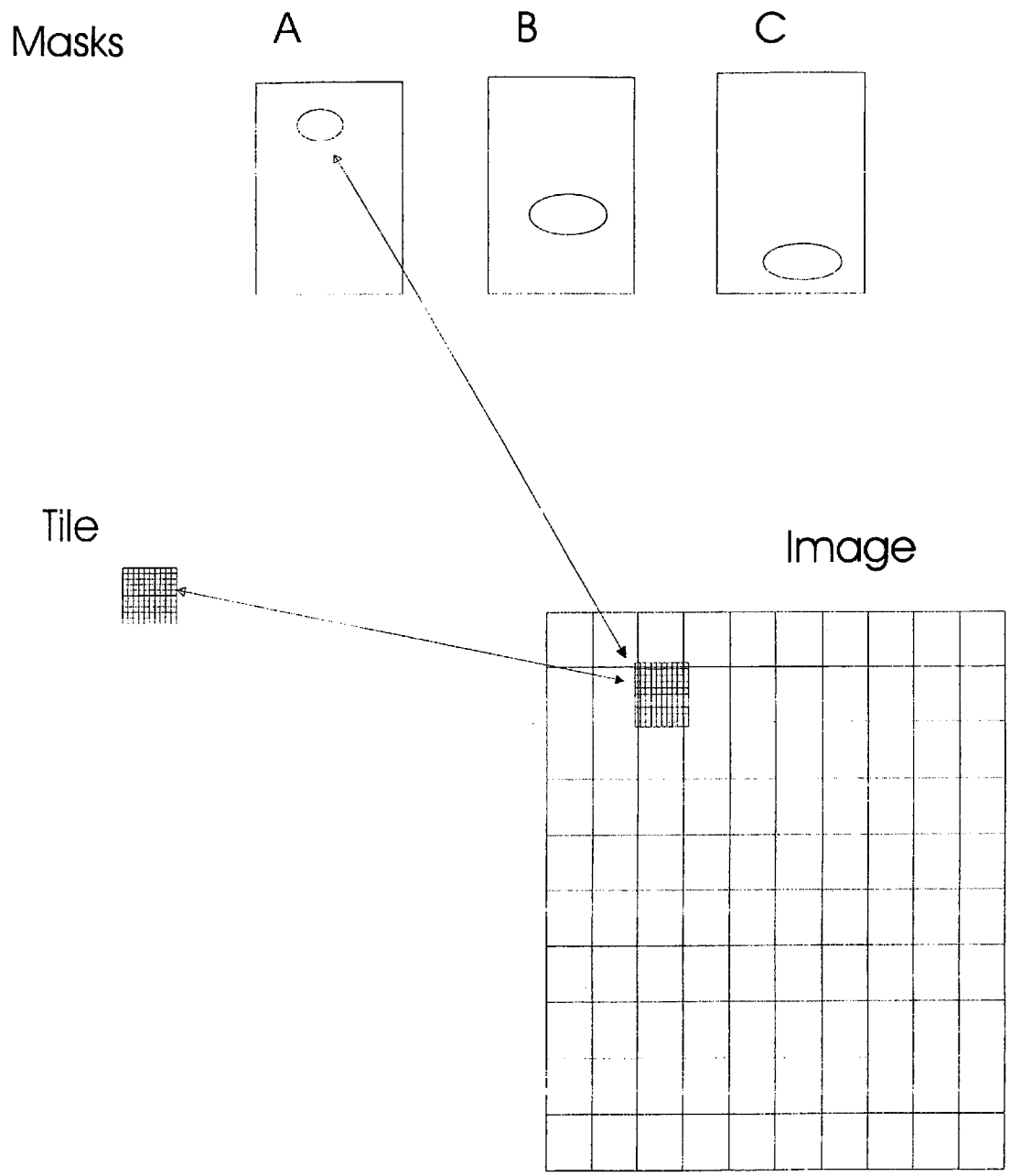
FIG. 3 shows an image divided into a grid.

As is conventional, in order to achieve reliability the image is divided into a grid as shown in FIG. 3. Each square in the grid will be x pixels on each side and thus each square will consist of $x^2$ pixels. The watermark data is inserted into each of the squares on the grid. The watermark data (termed the payload) is specified by a payload tile. The payload tile defines an amount of change for each pixel in the tile. The size of the tile is the same size as the size of the squares in the grid on the image, that is, in the example given the payload tile will have $x^2$ pixels. The tile specifies a relative amount of change for each pixel in a square on the image that will result in a particular watermark payload. The value of the changes specified by the payload tile are calculated using watermarking techniques such as those described in the previously referenced patent and patent applications. In prior watermarking techniques the pixels in each square of the grid on the image are changed in accordance with the amounts specified in the payload tile in order to watermark the image.

However, with this technology, when changing the pixels in the image in accordance with the payload tile, an additional intensity factor can be taken into account. For example, in a particular square on the grid, the pixels in the square may only be changed by one half of the amount specified in the payload tile. In another square on the grid, the pixels may be changed by seventy five percent of the amounts specified in the payload tile. That is, a watermark can be inserted into the image by changing each pixel in the image by an amount specified by an associated pixel in a payload tile, as modified by an intensity factor. The intensity factor for each pixel in the image is specified using the previously described masks which define an appropriate intensity for different areas of the image.

The watermarking operation proceeds as shown in FIG. 3. Each pixel in each square of the image is changed by an amount which depends both on the value specified for the corresponding pixel in the payload tile and by an intensity value. The intensity value is determined by looking at a series of masks. Each mask specifies a particular intensity. If the mask has an image at the location of the corresponding pixel, the intensity associated with that mask will control the intensity of the change.

The masks are ordered (with the mask specifying areas with the least intensity first) and if two masks have images at the same location, the first mask in the series controls the intensity of the pixels. The payload tile includes a value for each pixel in a square on the image. Each pixel in each square of the image is changed by an amount that depends both on the value specified by the associated pixel in the payload tile and by the various masks that define areas of the image to be watermarked at various intensities. The intensity that should be associated with a mask for an area having a particular width index can be determined by trial and error. However, once determined this value can be used for subsequent operations. That is, the shape of the masks for different images will vary according to the characteristics of the image. The intensity value assigned to a mask which represents an area having a particular width index can be the same for different images.

Figure 4:
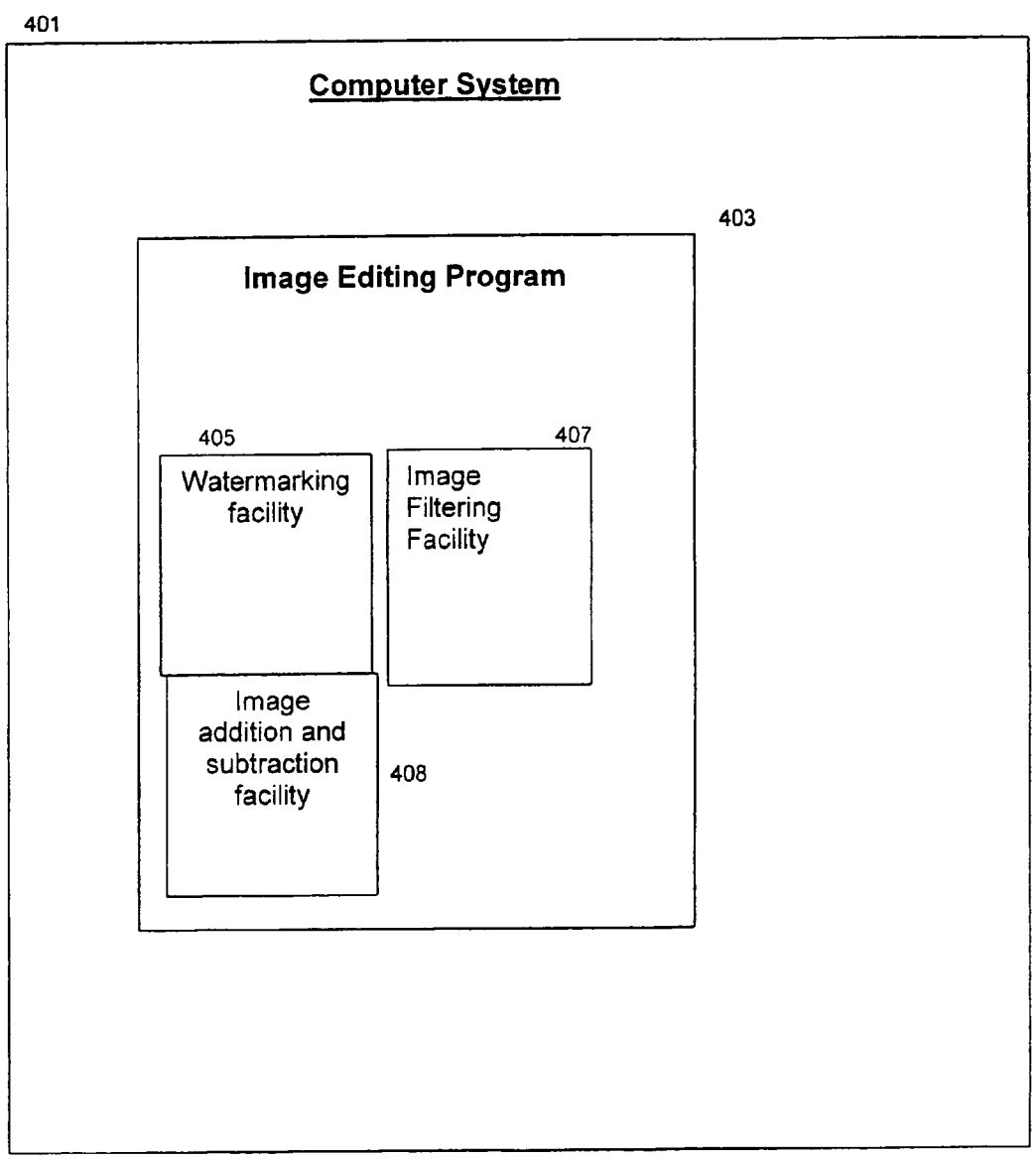
FIG. 4 shows a computer with the programs used to practice one embodiment of the present invention.

A system for performing the above described operations is shown in FIG. 4. The system includes a conventional personal computer system 401. This can for example be an Intel Pentium III system operating under the Microsoft Windows operating system. The computer system 401 includes conventional I-O devices such as a display, a keyboard, a printer, etc., conventional storage devices such as. RAM, hard drive, CD drive etc. Such conventional components are not shown in FIG. 4.

The system includes an image editing program 403 such as for example the Adobe Photoshop image editing program. The image editing program 403 includes an image watermarking facility 405, an image filtering facility 407, and an image addition and subtraction facility 408. Except for the details described herein, the image editing program 403, the watermarking facility 405, the filtering facility 407, and the image addition and subtraction facility 408 are conventional components.

Figure 5:
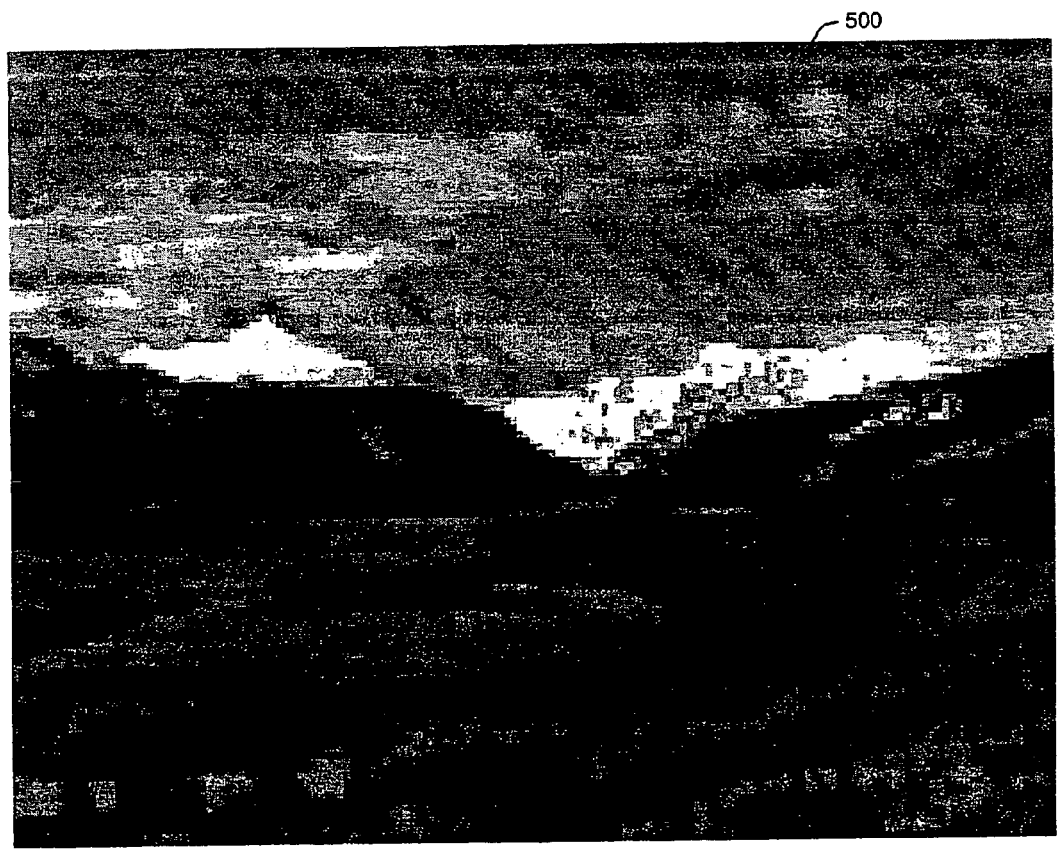
FIG. 5 is an example of a gray scale image.

The embodiment described above applied a watermark to an image that consisted of a series of lines with different width. The embodiment described below applies the technology to a half tone image such as that shown in FIG. 5. The half tone image shown in FIG. 5 is a conventional halftone image. It can, for example, be a single color channel of a multicolor image.

Figure 6:
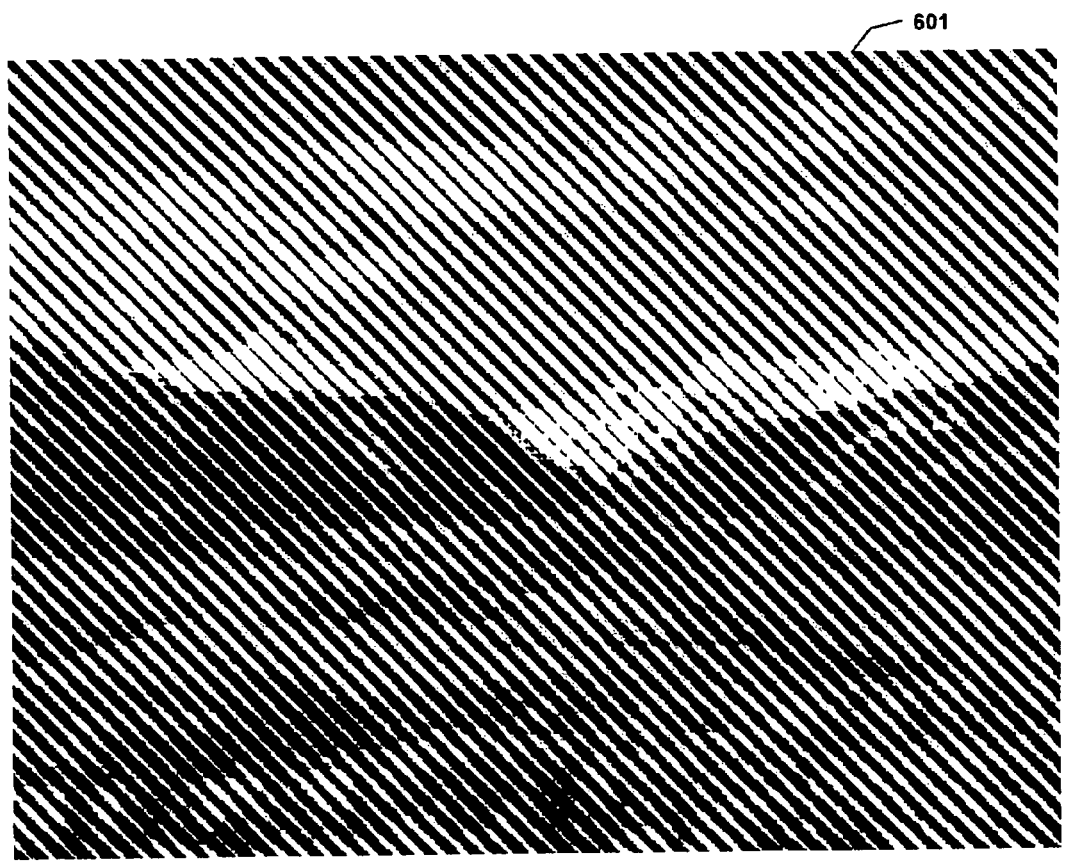
FIG. 6 is an example of a line art image where the binary elements are lines.

Halftone images, such as image 500 shown in FIG. 5, can be transformed into line art images such as line art image 601 shown in FIG. 6. This conversion can be done by conventional, well knows processes regularly used in the printing industry. After a half tone image such as image 500 shown in FIG. 5 is converted to a line art image such as image 601 shown in FIG. 6, the technology can be applied as previously explained with respect to the first embodiment. That is, image 601 shown in FIG. 6 can be divided into areas, each of which has lines the width of which falls in a particular range. This can be done as previously explained by applying line width filters and subtracting from the original image to form a series of masks, each of which define an area with lines whose width fall within a selected or specified range.

After the areas with lines of similar width are defined as described above, the image is watermarked. As in the first embodiment, the intensity at each location in the image is defined by both the payload tile and the masks which define the area having line width in a specified range.

The line art image 601 shown in FIG. 6 appears as a series of lines. As is well known in the printing art, the elements in a line art image need not be lines. The elements in the line art image can be circles as in image 701 shown in FIG. 7. The particular shape of the elements is generally selected for various esthetic reasons and the present technology can be used with elements having any desired shape. The filtering to define areas having the same tonal density would proceed as previously described irrespective of the shape of the elements in the line art image.

Figure 7:
FIG. 7 is an example of a line art image where the binary elements are circles.

It should be understood that the images shown in FIGS. 5, 6 and 7 are merely representative of gray scale images. The present technology can be applied to gray scale images developed with any of the processes known in the printing industry.

Digital images consist of an array of bits or pixels. With the present technology, the bits or pixels in an image are divided in two ways. First the bits or pixels of an image are divided into arrays the size of a watermark payload tile as is conventional. Second the pixels of the image are divided into what can be termed secondary control areas.

The first division of the pixels or bits is into areas that are identical in size. That is, the first division divides the pixels into areas each of which is the size of the payload tile. The payload tile specifies the change in each bit or pixel in an area the size of said payload tile. The amount specified by the values in said payload tile is the amount which is appropriate for the watermark to carry the desired payload data. The values in the payload tile can be established and used on a perceptually adaptive basis.

The secondary control areas are not necessarily identical in size. Furthermore, the size of the secondary control areas is not related to the size of the watermark tile. The secondary control areas are areas of the image which have some particular characteristic. For example they are areas of the image which have lines within a specified width range or areas which have tonal density values within a specified range.

Each secondary control area has an associated control value. For example the control value associated with each secondary control area can be the intensity of the watermark which is appropriate for the particular area.

The embodiments described herein give specific and novel techniques for dividing an image into secondary control areas. It should however, be understood that various other and different techniques can be utilized to define secondary control area for a document.

While out technology has been illustrated above with respect to various embodiments, it will be appreciated by those skilled in the art that that the scope thereof exceeds the specific embodiments described herein. Various other changes in form and detail can be made without departing from the sprit and scope of our inventive work invention.

The scope of applicant's invention is limited only by the appended claims.

We claim:

1. In a method of digitally watermarking an image by changing aspects thereof to steganographically convey a plural-bit payload, an improvement comprising:
   receiving image data representing a pattern of elements of differing spatial sizes but of uniform color;
   applying a first filtering function to said image data to identify a first portion of the image represented thereby, said first portion comprising one or more regions having image elements within a first range of sizes;
   applying a digital watermarking procedure to said first portion of the image using a first watermarking intensity;
   applying a second filtering function to said image data to identify a second portion of the image represented thereby, said second portion comprising one or more regions having image elements within a second range of sizes;
   applying a digital watermarking procedure to said second portion of the image using a second watermarking intensity greater than the first;
   wherein the method includes performing said watermarking procedures using a computer that is programmed to perform said procedures pursuant to instructions from program software.

2. A method of processing a color image comprised of at least first and second color channel images, the method including performing the method of claim 1 on the first color channel image.

3. The method of claim 1 wherein said elements comprise halftone elements of varying sizes.

4. The method of claim 1 that includes printing said digitally watermarked image on a substrate to produce a printed document.

5. A printed document produced by the method of claim 4.

6. In a method of digitally watermarking an image by changing aspects thereof to steganographically convey a plural-bit payload, an improvement comprising:
   receiving image data representing a pattern of elements of differing spatial sizes but of uniform color;
   applying a first filtering function to said image data to identify a first portion of the image represented thereby, said first portion comprising one or more regions having image elements within a first range of sizes;
   applying a digital watermarking procedure to said first portion of the image using a first watermarking intensity;
   applying a second filtering function to said image data to identify a second portion of the image represented thereby, said second portion comprising one or more regions having image elements within a second range of sizes;
   applying a digital watermarking procedure to said second portion of the image using a second watermarking intensity greater than the first;
   wherein if said first and second portions define a region of overlap, then applying a digital watermarking procedure to said overlap region using said first watermarking intensity rather than said second watermarking intensity; and
   wherein the method includes performing said watermarking procedures using a computer that is programmed to perform said procedures pursuant to instructions from program software.

7. In a method of digitally watermarking an image by changing aspects thereof to steganographically convey a plural-bit payload, an improvement comprising:
   receiving image data representing a pattern of elements of differing spatial sizes but of uniform color;
   applying a first filtering function to said image data to identify a first portion of the image represented thereby, said first portion comprising one or more regions having image elements within a first range of sizes;
   applying a digital watermarking procedure to said first portion of the image using a first watermarking intensity;
   applying a second filtering function to said image data to identify a second portion of the image represented thereby, said second portion comprising one or more regions having image elements within a second range of sizes;
   applying a digital watermarking procedure to said second portion of the image using a second watermarking intensity greater than the first;
   wherein said elements comprise lines of varying widths; and wherein the method includes performing said watermarking procedures using a computer that is programmed to perform said procedures pursuant to instructions from program software.

8. In a method of digitally watermarking a two-dimensional image by changing aspects thereof to steganographically convey a plural-bit payload, the image comprising a pattern of elements, an improvement comprising:

defining a first two-dimensional mask, said first mask serving to identifying a first portion of the image, said first portion spanning plural of said elements;

defining a second two-dimensional mask, said second mask serving to identifying a second portion of the image, said second portion spanning plural of said elements;

watermarking the portion of the image identified by the first mask using a first watermarking intensity; and watermarking the portion of the image identified by the second mask using a second, greater watermarking intensity;

wherein if said first and second masks define a portion of overlap, then watermarking said overlap portion using said first watermarking intensity rather than said second watermarking intensity; and wherein the method includes performing said watermarking procedures using a computer that is programmed to perform said procedures pursuant to instructions from program software.

9. In a method of digitally watermarking a two-dimensional image by changing aspects thereof to steganographically convey a plural-bit payload, the image comprising a pattern of elements, an improvement comprising:

defining a first two-dimensional mask, said first mask serving to identifying a first portion of the image, said first portion spanning plural of said elements;

defining a second two-dimensional mask, said second mask serving to identifying a second portion of the image, said second portion spanning plural of said elements;

watermarking the portion of the image identified by the first mask using a first watermarking intensity; and watermarking the portion of the image identified by the second mask using a second, greater watermarking intensity;

wherein said elements comprise lines of varying widths; and wherein the method includes performing said watermarking procedures using a computer that is programmed to perform said procedures pursuant to instructions from program software.

10. The method of claim 9 wherein;

the first portion of said image, identified by said first mask, includes regions of the image in which said lines have widths within a first range; and the second portion of said image, identified by said second mask, includes regions of the image in which said lines have widths within a second range.

11. In a method of digitally watermarking a two-dimensional image by changing aspects thereof to steganographically convey a plural-bit payload, the image comprising a pattern of elements, an improvement comprising:

defining a first two-dimensional mask, said first mask serving to identifying a first portion of the image, said first portion spanning plural of said elements;

defining a second two-dimensional mask, said second mask serving to identifying a second portion of the image, said second portion spanning plural of said elements;

watermarking the portion of the image identified by the first mask using a first watermarking intensity; and watermarking the portion of the image identified by the second mask using a second, greater watermarking intensity;

wherein said elements comprise halftone elements of varying sizes; and wherein the method includes performing said watermarking acts using a computer that is programmed to perform said watermarking acts pursuant to instructions from program software.

12. The method of claim 11 wherein;

the first portion of said image, identified by said first mask, includes regions of the image in which said halftone elements have sizes within a first range; and the second portion of said image, identified by said second mask, includes regions of the image in which said halftone elements have sizes within a second range.

13. In a method of digitally watermarking a two-dimensional image by changing aspects thereof to steganographically convey a plural-bit payload, the image comprising a pattern of elements, an improvement comprising:

identifying a first portion of the image comprising elements having a first similar characteristic, said first portion spanning plural of said elements;

identifying a second portion of the image comprising elements having a second similar characteristic different than the first characteristic, said second portion spanning plural of said elements;

watermarking the first portion of the image using a first watermarking intensity; and watermarking the second portion of the image using a second, greater watermarking intensity;

wherein the method includes performing said identifying and watermarking with a computer that is programmed to perform said acts pursuant to instructions from program software, and wherein the first similar characteristic comprises elements defining lines having a first range of widths, and the second similar characteristic comprises elements not defining lines having said first range of widths.

14. In a method of digitally watermarking a two-dimensional image by changing aspects thereof to steganographically convey a plural-bit payload, the image comprising a pattern of elements, an improvement comprising:

identifying a first portion of the image comprising elements having a first similar characteristic, said first portion spanning plural of said elements;

identifying a second portion of the image comprising elements having a second similar characteristic different than the first characteristic, said second portion spanning plural of said elements;

watermarking the first portion of the image using a first watermarking intensity; and watermarking the second portion of the image using a second, greater watermarking intensity;

wherein the method includes performing said identifying and watermarking with a computer that is programmed to perform said acts pursuant to instructions from program software, and wherein the first similar characteristic comprises elements defining lines having a first range of widths, and the second similar characteristic comprises elements having a second, different, range of widths.

15. In a method of digitally watermarking a two-dimensional image by changing aspects thereof to steganographically convey a plural-bit payload, the image comprising a pattern of elements, an improvement comprising:

identifying a first portion of the image comprising elements having a first similar characteristic, said first portion spanning plural of said elements;

identifying a second portion of the image comprising elements having a second similar characteristic different than the first characteristic, said second portion spanning plural of said elements;

watermarking the first portion of the image using a first watermarking intensity; and watermarking the second portion of the image using a second, greater watermarking intensity;

wherein the method includes performing said identifying and watermarking with a computer that is programmed to perform said acts pursuant to instructions from program software, and wherein the first similar characteristic comprises elements defining structures having a first range of sizes, and the second similar characteristic comprises elements not defining structures having said first range of sizes.

16. In a method of digitally watermarking a two-dimensional image by changing aspects thereof to steganographically convey a plural-bit payload, the image comprising a pattern of elements, an improvement comprising:

identifying a first portion of the image comprising elements having a first similar characteristic, said first portion spanning plural of said elements;

identifying a second portion of the image comprising elements having a second similar characteristic different than the first characteristic, said second portion spanning plural of said elements;

watermarking the first portion of the image using a first watermarking intensity; and watermarking the second portion of the image using a second, greater watermarking intensity;

wherein the method includes performing said identifying and watermarking with a computer that is programmed to perform said acts pursuant to instructions from program software, and wherein the first similar characteristic comprises elements defining structures having a first range of sizes, and the second similar characteristic comprises elements having a second, different, range of sizes.

17. A computer readable storage medium having program software instructions stored thereon for causing a computer to perform acts including:

identify a first portion of a two-dimensional image that comprises elements having a first similar characteristic, said first portion spanning plural elements;

identify a second portion of the image that comprises elements having a second similar characteristic different than the first characteristic, said second portion also spanning plural elements;

steganographically watermark the first portion of the image using a first watermark intensity; and steganographically watermark the second portion of the image using a second, greater watermark intensity;

wherein the first similar characteristic comprises elements defining structures having a first range of sizes, and the second similar characteristic comprises elements not defining structures having said first range of sizes.

* * * * *